May 1, 1945. D. H. CUNNINGHAM 2,374,736
SPOOL
Filed Nov. 29, 1943
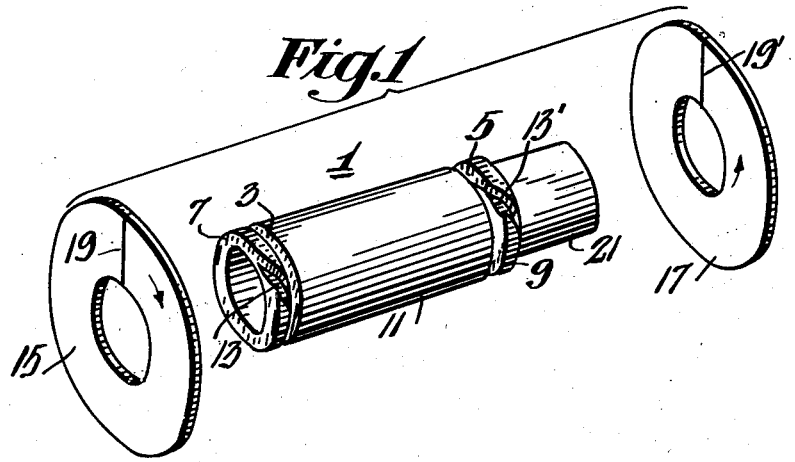
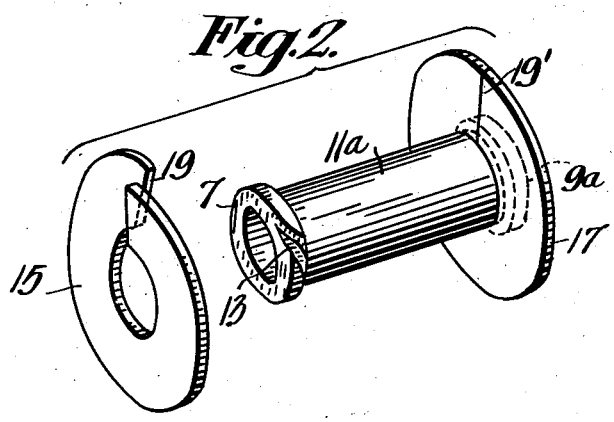
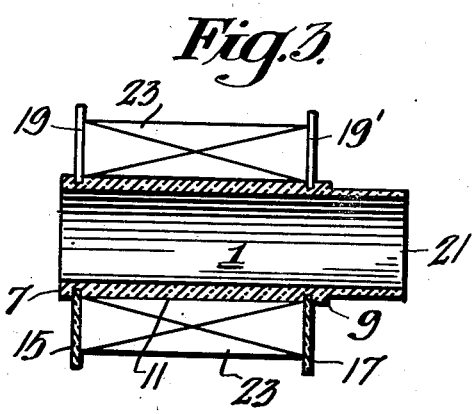
Inventor
David H. Cunningham
By
Attorney Patented May 1, 1945

2,374,736

UNITED STATES PATENT OFFICE 2,374,736

SPOOL

David H. Cunningham, Haddonfield, N. J., assignor to Radio Corporation of America, a corporation of Delaware Application November 29, 1943, Serial No. 512,106

8 Claims. (Cl. 242—118)

This invention relates to spools and particularly to improvements in spools or "coil forms" for use in radio and other electrical apparatus.

For mounting multi-layer coils the prior art dictates the use of molded forms and, alternatively, spools cut (as on a lathe) from solid blocks of insulating material. The high cost of molds can be justified only when duplicate forms are to be produced in relatively enormous quantities. Both molded and cut coil forms waste packing, shipping and storage space and the latter type is subject to the further objection that its manufacture involves an extravagant use of war-scarce material.

Accordingly, the principal object of the present invention is to provide a simple and inexpensive, yet rugged coil form, and one having easily assembled separable parts made with a minimum of machining from standard insulating tubular and sheet materials.

Certain preferred details of construction together with other objects and advantages will be apparent and the invention itself will be best understood by reference to the following specification and to the accompanying drawing, wherein:

Figure 1 is an exploded view of a coil form embodying the invention,

Figure 2 is a view in perspective showing another coil form, within the invention, partly assembled, and Figure 3 is a longitudinal sectional view of the coil form of Figure 1 completely assembled and with a coil mounted thereon.

In the embodiment of the invention shown in Figures 1 and 3, 1 designates, generally, a hollow cylindrical member which may be constituted of a plastic (e. g., "Bakelite") impregnated fabric of any desired (preferably "standard") dimensions. This cylinder 1 is provided on its outer surface with two spaced-apart circumferential grooves 3 and 5, which divide the said surface into two rim portions 7 and 9 and an intermediate coil-receiving central portion 11.

Each of the rim portions 7 and 9 is provided with a female thread 13 (13') comprising a helical groove of less than one full turn which extends from the outer surface of the rim across the periphery thereof and terminates within the adjacent groove. Two separate annular coil-retaining end-pieces for the cylindrical form 1 are designated 15 and 17, respectively. Like the cylindrical part 1, these end-pieces 15 and 17 are constituted of a strong, stiff and difficultly distortable material such, for example, as a laminated Bakelite-impregnated fabric.

The inside diameter of the separate end-pieces 15 and 17 is less than that of the rim portions 7 and 9 of the cylinder 1 and preferably corresponds substantially to that of the diameter of the grooves 3 and 5 within which they are to be seated. As indicated at 19, 19', each of the annular parts 15 and 17 is provided with a radially extending slit so that it may be distorted (see Fig. 2) adjacent to the slit and entered on to the cylindrical member 1 by fitting the distorted inner annular portion thereof into the female threads 13, 13', respectively, and screwing them in the direction of the arrows (Fig. 1) over the rim portions 7 and 9 of the cylinder 1. If desired, one or both ends of the cylinder 1 may be provided with a longitudinal extension 21 of reduced diameter for mounting purposes.

Referring still to Figures 1 and 3, it will be apparent that when the longitudinal extension 21 is omitted, the only cutting operations required in the manufacture of the cylindrical part 1 from a tube of standard configuration and size are the relatively simple ones involved in making the grooves 3 and 5 and the helical slots 13, 13'.

In the embodiment of the invention shown in Fig. 2, the space between the grooves 3 and 5 of Figs. 1 and 3 has been cut away to provide a coil-receiving section 11a of uniformly reduced diameter. Thus, both of the end-pieces 15 and 17 may be entered on to the section 11a over the same flange or rim portion (7) and there is no need to provide the other rim portion (9a) with a helical groove. The absence of retaining grooves for the annular end-pieces 15 and 17 is of no especial moment since, when a coil is wound on the central section 11a, the said end pieces will be urged into engagement with the inner facing surfaces of the rims 7 and 9a and maintain them in rigid alignment.

It will be apparent from the foregoing that the present invention provides a simple, inexpensive and yet rugged spool or coil form, and one having easily assembled separable parts made with a minimum of machining from standard insulating tubular and sheet materials.

I claim as my invention:

1. A spool including the combination of a cylindrical member having a circumferential flange on its outer surface and provided with a female thread on the periphery of said flange, and a separable annular member constituted of a difficultly distortable material having an inside diameter less than that of said flange, said annular member being provided with a slit extending outwards from the inner periphery thereof whereby it may be distorted adjacent to said slit and entered on to said cylindrical member by fitting the distorted inner annular portion thereof into said female thread and screwing it over said flange.

2. The invention as set forth in claim 1 and wherein said female thread comprises a helical groove of less than one full turn.

3. The invention as set forth in claim 1 and wherein said difficultly distortable material comprises a plastic impregnated fabric.

4. The invention as set forth in claim 1 and wherein said circumferential flange is integral with said cylindrical member.

5. A spool including the combination of a cylindrical member provided with a cylindrical groove on its outer surface adjacent to an end thereof and defining the inner side of a rim portion of said cylindrical member, said rim portion being provided with a female thread extending from the outer boundary of said rim across the periphery and communicating with said circumferential groove, and a separable annular end-piece constituted of a difficultly distortable material having an inside diameter corresponding substantially to that of said cylindrical groove, said end piece being provided with a slit extending outwards from the inner periphery thereof whereby it may be distorted adjacent to said slit and entered into said groove by fitting the distorted inner peripheral portion of said annulus into said female thread and screwing it past said rim portion of said cylindrical member.

6. The invention as set forth in claim 5 and wherein the thickness of said annular end-piece corresponds substantially to the width of the circumferential groove on the outer surface of said cylindrical member.

7. The invention as set forth in claim 5 and wherein said cylindrical member is provided with a second groove adjacent to its opposite end, and a second annular end-piece of duplicate construction and adapted to be received within said second groove.

8. A spool including the combination of a cylindrical member having a pair of spaced-apart circumferential flanges on its outer surface, at least one of said flanges having a female thread on the periphery thereof, and a plurality of annular members constituted of a difficultly distortable material having an inside diameter corresponding substantially to the outside diameter of said cylindrical member, each of said annular members being provided with a slit extending outwardly from the inner periphery thereof whereby they may be distorted adjacent to said slit, and entered on to said intermediate portion of said cylindrical member and subsequently positioned adjacent the inside faces of said flanges by first fitting the distorted inner annular portion of each annulus into said female thread and screwing it over said threaded flange.

DAVID H. CUNNINGHAM.